(12) United States Patent
Fornage (10) Patent No.: US 9,407,169 B2
(45) Date of Patent: *Aug. 2, 2016

(54) METHOD AND APPARATUS FOR DISTRIBUTED POWER GENERATION

(71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/289,404

(22) Filed: May 28, 2014

(65) Prior Publication Data

US 2014/0268961 A1 Sep. 18, 2014

Related U.S. Application Data

(63) Continuation of application No. 13/068,014, filed on Apr. 29, 2011, now Pat. No. 8,811,049.

(60) Provisional application No. 61/343,481, filed on Apr. 29, 2010.

(51) Int. Cl.
*H02M 7/483* (2007.01)
*H02M 7/5387* (2007.01)
*H02J 3/00* (2006.01)
*H02M 7/539* (2006.01)

(52) U.S. Cl.
CPC ........... *H02M 7/53871* (2013.01); *H02J 3/005* (2013.01); *Y10T 307/707* (2015.04)

(58) Field of Classification Search
CPC ... H02M 7/483; H02M 7/539; H02M 7/5387; H02M 7/53871
USPC ................. 363/97, 98, 131, 132; 323/906
See application file for complete search history.

(56) References Cited

U.S. PATENT DOCUMENTS

| 4,467,407 A | 8/1984 | Asano et al. |
|---|---|---|
| 5,886,890 A | 3/1999 | Ishida et al. |
| 6,154,379 A * | 11/2000 | Okita ................. H02M 7/48 363/40 |

(Continued)

OTHER PUBLICATIONS

International Search Report and written opinion mailed Jan. 11, 2012 for PCT Application No. PCT/US2011/034324.

*Primary Examiner* — Gary L Laxton
(74) *Attorney, Agent, or Firm* — Moser Taboada (57) ABSTRACT

A method and apparatus for generating AC power. In one embodiment, the apparatus comprises a DC/AC inversion stage capable of generating at least two of a single-phase output power, a two-phase output power, and a three-phase output power; and a conversion control module, coupled to the DC/AC inversion stage, for driving the DC/AC inversion stage to (i) generate the single-phase output power while an input power is less than a first threshold, and (ii) operate in burst mode while the input power satisfies a burst mode threshold.

18 Claims, 5 Drawing Sheets

(56) References Cited

U.S. PATENT DOCUMENTS

| | | |
|---|---|---|
| 6,252,785 B1 | 6/2001 | Hagihara et al. |
| 7,327,128 B2 | 2/2008 | Dinh |
| 7,414,870 B2 | 8/2008 | Röttger et al. |
| 7,609,040 B1 | 10/2009 | Jain |
| 7,768,155 B2 | 8/2010 | Fornage |
| 7,855,473 B2 | 12/2010 | Fornage |
| 8,350,411 B2 | 1/2013 | Kimball et al. |
| 8,811,049 B2 * | 8/2014 | Fornage ............ H02J 3/005 307/82 |
| 8,837,179 B2 * | 9/2014 | Ishioka ............ H02M 7/493 363/65 |
| 2007/0217239 A1 | 9/2007 | Rottger et al. |
| 2009/0242272 A1 | 10/2009 | Little et al. |
| 2009/0315404 A1 | 12/2009 | Cramer et al. |
| 2010/0066319 A1 | 3/2010 | Qiu et al. |
| 2012/0262960 A1 | 10/2012 | Giraut Ruso et al. |

* cited by examiner

METHOD AND APPARATUS FOR DISTRIBUTED POWER GENERATION

CROSS-REFERENCE TO RELATED APPLICATIONS

This application is a continuation of U.S. patent application Ser. No. 13/068,014, filed Apr. 29, 2011, which issued as U.S. Pat. No. 8,811,049 on Aug. 19, 2014 and claims benefit of U.S. provisional patent application Ser No. 61/343,481, filed Apr. 29, 2010. Each of the aforementioned patent applications is herein incorporated in its entirety by reference.

BACKGROUND OF THE INVENTION

1. Field of the Invention

Embodiments of the present disclosure relate generally to power conversion and, in particular, to operating a multi-phase DC/AC inverter.

2. Description of the Related Art

Use of distributed generators (DGs) to produce energy from renewable resources is steadily gaining commercial acceptance due to the rapid depletion of existing fossil fuels and the increasing costs of current methods of generating power. One such type of DG may be a solar power system comprising a plurality of photovoltaic (PV) modules that convert solar energy received from the sun into a direct current (DC). One or more inverters then convert the DC current from the PV modules into an alternating current (AC). The AC power generated may then be used to run appliances at a home or business, or may be sold to the commercial power company.

In some DG systems, one or more inverters may each generate multi-phase AC power. For example, an inverter may comprise a three-phase H-bridge for converting the DC input power to a three-phase AC output power. When these inverters operate during periods of reduced input power from the PV modules, such as at sunset or when the sun is obscured by a cloud, a relatively large amount of energy is expended operating all legs of the three-phase H-bridge to achieve the three-phase output power. As a result, the inverter suffers from an inefficient power conversion.

Therefore, there is a need in the art for a method and apparatus for efficiently operating a multi-phase DC/AC inverter.

SUMMARY OF THE INVENTION

Embodiments of the present invention generally relate to a method and apparatus for generating AC power. In one embodiment, the apparatus comprises a DC/AC inversion stage capable of generating at least two of a single-phase output power, a two-phase output power, and a three-phase output power; and a conversion control module, coupled to the DC/AC inversion stage, for driving the DC/AC inversion stage to (i) generate the single-phase output power while an input power is less than a first threshold, and (ii) operate in burst mode while the input power satisfies a burst mode threshold.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
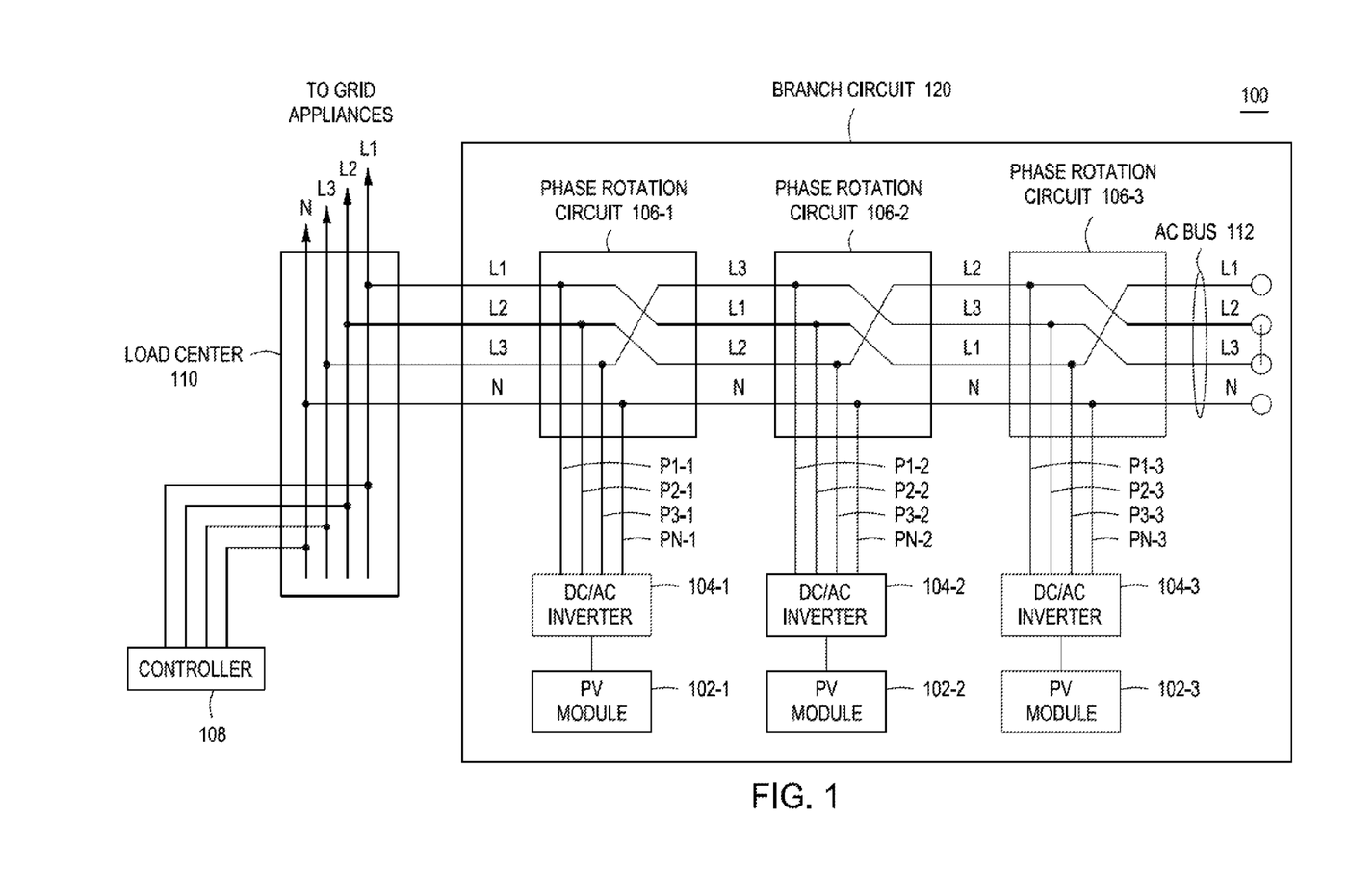
FIG. 1 is a block diagram of a power generation system in accordance with one or more embodiments of the present invention.

FIG. 1 is a block diagram of a power generation system 100 ("system 100") in accordance with one or more embodiments of the present invention. This diagram only portrays one variation of the myriad of possible system configurations. The present invention can function in a variety of environments and systems.

The system 100 comprises a plurality of PV modules 102-1, 102-2, and 102-3, collectively referred to as PV modules 102, and a plurality of DC/AC inverters 104-1, 104-2, and 104-3, collectively referred to as inverters 104. Each inverter 104-1, 104-2, and 104-3 is coupled in a one-to-one correspondence to a PV module 102-1, 102-2, and 102-3, respectively. Each inverter 104-1, 104-2, and 104-3 is further coupled in a one-to-one correspondence to a phase rotation circuit 106-1, 106-2, and 106-3, respectively; the phase rotation circuits 106-1, 106-2, and 106-3 are collectively referred to as phase rotation circuits 106. The phase rotation circuits 106 couple AC power from the inverters 104 to an AC bus 112, and, along with the PV modules 102, 106 form a branch circuit 120 that couples three-phase AC power to the load center 110.

In some embodiments, a DC/DC converter may be coupled between each PV module 102 and each inverter 104 (e.g., one converter per PV module 102). Alternatively, one or more of the inverters 104 may be coupled to multiple PV modules 102; for example, the PV modules 102 may all be coupled to a single, centralized inverter 104. In some such embodiments, a DC/DC converter may be coupled between each PV module 102 and the corresponding inverter(s) 104. In some alternative embodiments, the inverters 104 may receive DC power from a DC source other than the PV modules 102.

The phase rotation circuits 106 couple the inverters 104 to power lines L1, L2, L3, and N at the load center 110 via the AC bus 112. The power lines L1, L2, L3, and N are power lines of a three-phase AC power system; power lines L1, L2, and L3 are live conductors each carrying a different phase of AC power, and N is a neutral conductor. Each inverter 104 comprises four inverter output lines, P1, P2, P3, and PN, for providing AC output power (i.e., inverter 104-1 comprises inverter output lines P1-1, P2-1, P3-1, and PN-1; inverter 104-2 comprises inverter output lines P1-2, P2-2, P3-2, and PN-2; and inverter 104-3 comprises inverter output lines P1-3, P2-3, P3-3, and PN-3). The phase rotation circuits 106 couple the inverter output lines PN to the neutral line N. Additionally, the phase rotation circuits 106 couple the inverter output lines P1, P2, and P3 in "rotated" configurations to the power lines L1, L2, L3 at each inverter 104. For example, the phase rotation circuit 106-1 couples inverter output lines P1-1, P2-1, and P3-1 to power lines L1, L2, and L3, respectively; the phase rotation circuit 106-2 couples inverter output lines P1-2, P2-2, and P3-2 to power lines L3, L1, and L2, respectively; and the phase rotation circuit 106-3 couples inverter output lines P1-3, P2-3, and P3-3 to power lines L2, L3, and L1, respectively. The phase rotation circuits 106 thus rotate the phases of AC power coupled to the AC bus 112 between the inverters 104. Accordingly, three of the phase rotation circuits 106 coupled in series act to completely rotate the three phases of AC power in a three-phase AC power system as depicted in FIG. 1.

One example of such a phase rotation circuit may be found in commonly assigned, U.S. Pat. No. 7,855,473 entitled "Apparatus for Phase Rotation for a Three-Phase AC Circuit" and issued Dec. 21, 2010, which is herein incorporated in its entirety by reference. In some alternative embodiments, the phase rotation circuits 106 may be contained within the inverters 104 (i.e., each inverter 104 comprises a single phase rotation circuit 106). In some other alternative embodiments, the phase rotation circuits 106 may be excluded from the system 100 and each inverter 104 may be coupled to lines L1, L2, and L3 such that the same phase rotating effect between the inverters 104 is achieved.

A controller 108 is also coupled to the power lines L1, L2, L3, and N at the load center 110; alternatively, the controller 108 may be coupled to a subset of the power lines L1, L2, L3, and N depending upon the power requirements of the controller 108. The controller 108 provides operational control of the inverters 104, for example by communicating with the inverters 104 via power line communication (PLC) and/or other types of wired and/or wireless communication techniques. The controller 108 may further be communicatively coupled to a master controller (not shown) for sending information to/receiving information from the master control pertaining to operation of the inverters 104.

The inverters 104 are voltage source inverters (VSI) that convert DC power from the PV modules 102 to commercial power grid compliant AC power and then couple the AC power (i.e., an AC current) to the load center 110. The generated AC power may be further coupled from the load center 110 to one or more appliances (e.g., at a private residence or business) and/or to the commercial power grid. Additionally or alternatively, energy generated by the inverters 104 may be stored for later use; for example, the generated energy may be stored utilizing batteries, heated water, hydro pumping, $H_2O$-to-hydrogen conversion, or the like. In some other embodiments, the inverters 104 may be current source inverters (CSI), matrix inverters, cyclo-converters, or the like.

In accordance with one or more embodiments of the present invention, the inverters 104 each generate one, two, or three phases of AC power based on available power from the corresponding PV module 102. Each of the inverters 104 independently determines the number of phases of AC power that it generates, and each of the inverters 104 may generate one, two, or three phases of AC power independent of the number of phases of power being generated by the remaining inverters 104. For example, when receiving a low power level from a corresponding PV module 102 (e.g., an input power to the inverter 104 is less than a first threshold), an inverter 104 operates in a first phase quantity mode and generates a single phase of output power. When receiving a medium power level from the corresponding PV module 102 (e.g., an input power to the inverter 104 is between the first and a second threshold), the inverter 104 operates in a second phase quantity mode and generates two phases of output power. When receiving a high power level from the corresponding PV module 102 (e.g., an input power to the inverter 104 exceeds the second threshold), the inverter 104 operates in a third phase quantity mode and generates three phases of output power. The first and second thresholds may be determined based on a maximum admissible voltage ripple across the PV module 102 as determined by, for example, DC voltage and current of the PV module 102, values of one or more capacitors within the inverter 104, and frequency of the AC line to which the inverter 104 is coupled (e.g., the commercial power grid frequency). The decision point is built around maximum power conversion efficiency and maximum energy harvest; by reducing the number of phases generated when lower input power is received, less energy is expended in driving switches within the inverter 104 as described further below. In order to determine an optimum solution, losses may be computed either in real time or once and for all, and efficiency curves may be compared in all cases to select the best solution. In some embodiments, power may be the main input to this decision; additionally or alternatively, DC and grid voltages may be used as part of the decision.

In some alternative embodiments, the inverters 104 may be controlled such that each inverter 104 generates the same number of phases of AC output power.

In some embodiments, when an inverter 104 is operating to generate a single phase of output power, the inverter 104 may operate in a burst mode when the available power from the corresponding PV module 102 becomes low enough to satisfy a burst mode threshold. When operating in such a burst mode, the inverter 104 stores energy over one or more AC line cycles and subsequently "bursts" the stored energy to the output line. One example of burst mode operation may be found in commonly assigned Pat. No. 7,768,155, entitled "Method and Apparatus for Improved Burst Mode During Power Conversion" and issued Aug. 3, 2010.

Each inverter 104 evaluates available power from the corresponding PV module 102 every commercial power grid cycle for determining an appropriate phase-quantity mode (i.e., the number of phases of power to be generated); alternatively, available power may be evaluated more or less frequently for determining the phase-quantity mode. After evaluating the available power, each inverter 104 may then update (i.e., initiate, continue, or terminate) each phase of its output power to achieve the desired number of phases. In some embodiments, each phase may be updated every 2-10 grid cycles. Each phase of output power may be updated accordingly at its zero crossing (for example, power generation on a particular phase may cease at a zero-crossing for that phase); alternatively, all phases of output power from an inverter 104 may be updated simultaneously.

In some embodiments, such as the embodiment depicted in FIG. 1, the inverters 104 each generate the various phases of power on the same respective inverter output lines P1, P2, and P3. For example, when generating a single phase of power, the inverters 104 each generate the output power on inverter output line P1; when generating two phases of power, the inverters 104 each generate the output power on inverter output lines P1 and P2. The phase rotation performed by the phase rotation circuits 106 acts to maintain a substantially balanced three-phase power from the branch circuit 120 regardless of the number of phases out output power generated by the inverters 104. For example, if the inverters 104 are each generating a single phase of power, the phase rotation circuits 106 distribute the power to each of the power lines L1, L2, and L3.

In other embodiments, the phase rotation circuits 106 may be excluded from the system 100 and the phase rotation effect may be achieved by an alternative technique in order to ensure a substantially balanced three-phase output from the branch circuit 120. In some such embodiments, the inverters 104 may generate output power on the same respective inverter output lines and each inverter's output lines are coupled to the power lines in a "rotated" configuration from the previous inverter 104. For example, inverter output lines P1-1/P2-2/P3-3 are coupled to L1; P2-1/P3-2/P1-3 are coupled to L2; and P3-1/P1-2/P2-3 are coupled to L3 to ensure a substantially balanced three-phase output from the branch circuit independent of the number of phases of power generated by the inverters 104.

In still other embodiments where the phase rotation circuits 106 are not used, the inverter output lines are coupled to the same respective power lines and the phase rotation effect is achieved by varying the output lines that each inverter 104 uses for generating output power; i.e., when generating one or two phases of power, the inverters 104 each generate the output on a different subset of output lines. For example, the inverter output lines P1, P2, and P3 may be coupled to power lines L1, L2, and L3, respectively, and when generating a single phase of power the inverters 104 each use a different output line. The output lines on which the inverters 104 generate one or two phases of power may be determined based on a random allocation of power output to phase number (e.g., based on a random word generation, such as 1 to 3, at inverter power up), a decision based on inverter serial number (e.g., inverters having serial numbers within certain ranges utilize certain output lines), remote provisioning, information communicated from one or more inverters 104, information communicated from the controller 108, or similar techniques. In some such embodiments, the branch circuit 120 comprises a large number of inverters 104 such that some of the inverters 104 may generate a different number of phases from the remaining inverters 104 while still maintaining a substantially balanced three-phase power from the branch circuit 120.

In some alternative embodiments, the controller 108 may determine the phase quantity mode for one or more of the inverters 104 and control the inverters 104 to generate the corresponding number of phases of power. In such embodiments, the controller 108 may determine the phase quantity mode based on information obtained from the inverters 104 (e.g., via PLC) regarding power received from the PV modules 102. Additionally or alternatively, the controller 108 may control the inverters 104 to generate the output power on certain inverter output lines P1, P2, and/or P3 (e.g., when an inverter 104 generates a single phase of power, the controller 108 may specify that the generated power be output on inverter output line P1). In some other alternative embodiments, the inverters 104 may communicate with one another (e.g., via PLC) for determining the appropriate phase quantity mode and/or determining the inverter output lines P1, P2, and/or P3 on which to generate the output power (e.g., a single inverter 104 may determine a phase quantity mode for one or more other inverters 104 and communicates such information to the one or more other inverters 104).

In other alternative embodiments, a neutral line connection (i.e., connection to line N) may not be present. In such embodiments, the inverters 104 inject power utilizing at least two of the inverter output lines P1, P2, and/or P3.

In still other alternative embodiments, a substantially balanced two-phase AC power is required from the branch circuit 120 rather than a three-phase AC power. In such embodiments, the branch circuit 120 generally comprises an even number of phase rotation circuit 106/inverter 104 combinations, and the inverters 104 generate one or two phases of output power depending on the available PV module power.

Figure 2:
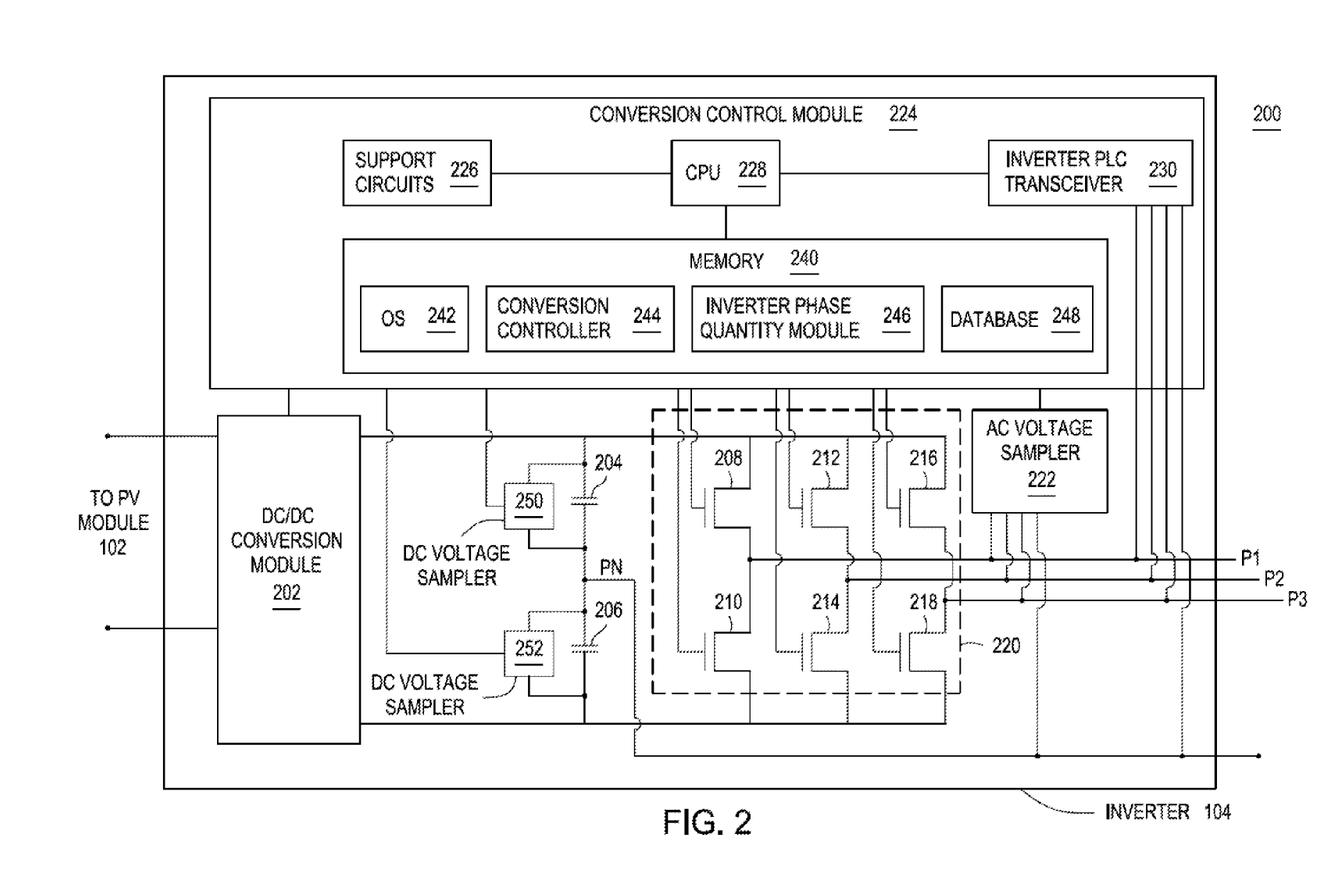
FIG. 2 is a block diagram of an inverter in accordance with one or more embodiments of the present invention.

FIG. 2 is a block diagram of an inverter 104 in accordance with one or more embodiments of the present invention. The inverter 104 comprises a DC/DC conversion module 202 coupled across a three-phase H-bridge 220 (i.e., a multi-phase DC/AC inversion stage) and a series combination of a first capacitor 204 and a second capacitor 206. The three-phase H-bridge 220 comprises three parallel legs, a first leg having a series combination of switches 208 and 210, a second leg having a series combination of switches 212 and 214, and a third leg having a series combination of switches 216 and 218. The switches 208, 210, 212, 214, 216, and 218 may be metal-oxide-semiconductor field-effect transistors (MOSFETs); alternatively, switches such as junction gate field-effect transistors (JFETs), insulated-gate bipolar transistor (IGBTs), and the like, may be used. Inverter output lines P1, P2, and P3 are coupled between the switches 208/210, 212/214, and 216/218, respectively, while the inverter output line PN is coupled between the capacitors 204/206. In some alternative embodiments, other types of multi-phase DC/AC inversion stages may be utilized in place of the three-phase H-bridge 220.

The inverter 104 further comprises DC voltage samplers 250 and 252 coupled across the capacitors 204 and 206, respectively, and AC voltage sampler 222 coupled to the inverter output lines P1, P2, P3, and PN. A conversion control module 224 is coupled to the DC/DC conversion module 202, the DC voltage samplers 250 and 252, gate terminals of each of the switches 208, 210, 212, 214, 216, and 218, the AC voltage sampler 222, and the inverter output lines P1, P2, P3, and PN.

The DC/DC conversion module 202 is coupled via two input terminals to the PV module 102 and converts a first DC power from the PV module 102 to a second DC power based on control signals from the conversion control module 224. The AC voltage sampler 222 provides samples of a line voltage (e.g., commercial power grid voltage on lines L1, L2, L3, and N) to the conversion control module 224, and the conversion control module 224 operates (i.e., activates/deactivates) the switches 208, 210, 212, 214, 216, and 218 such that the DC power from the DC/DC conversion module 202 is converted to one, two, or three phases of AC power and coupled to the commercial power grid in-phase with the line voltage. By reducing the number of phases generated when lower input power is received, less energy is expended in driving the switches 208, 210, 212, 214, 216, and 218.

The conversion control module 224 comprises at least one central processing unit (CPU) 228 coupled to an inverter power line communication (PLC) transceiver 230, support circuits 226, and memory 240. The inverter PLC transceiver 230 is coupled to the inverter output lines P1, P2, P3, and N for communicatively coupling the inverter 104 to other inverters 104 and/or the controller 108 via PLC. The CPU 228 may comprise one or more conventionally available microprocessors or digital signal processors (DSPs); additionally or alternatively, the CPU 228 may include one or more application specific integrated circuits (ASICs). The support circuits 226 are well known circuits used to promote functionality of the CPU 228. Such circuits include, but are not limited to, a cache, power supplies, clock circuits, buses, network cards, input/output (I/O) circuits, and the like. The conversion control module 224 may be implemented using a general purpose processor that, when executing particular software, becomes a specific purpose processor for performing various embodiments of the present invention.

The memory 240 may comprise random access memory, read only memory, removable disk memory, flash memory, and various combinations of these types of memory. The memory 240 is sometimes referred to as main memory and may, in part, be used as cache memory or buffer memory. The memory 240 generally stores the operating system (OS) 242 of the conversion control module 224. The OS 242 may be one of a number of commercially available operating systems such as, but not limited to, Linux, Real-Time Operating System (RTOS), and the like.

The memory 240 may store various forms of application software, such as a conversion controller 244 for controlling the operation of the inverter 104 (e.g., controlling the DC/DC conversion module 202 and the three-phase H-bridge 220) and a database 248 for storing data related to operation of the inverter 104 (e.g., one or more thresholds for determining the phase quantity mode, burst mode thresholds, and the like). The memory 240 may further comprise an inverter phase quantity module 246 for determining a phase quantity mode for the inverter 104 (i.e., whether the inverter 104 generates one, two, or three phases of AC power); additionally or alternatively, the phase quantity module 246 may determine on which inverter output lines P1, P2, and/or P3 the output power is to be generated. The conversion controller 244 may then operate the three-phase H-bridge 220 to generate the appropriate number of phases of AC power on certain inverter output lines.

The inverter phase quantity module 246 receives samples of the voltages across the capacitors 204 and 206 from the DC voltage samplers 250 and 252, respectively (i.e., data representing the voltages across the capacitors 204 and 206). Such samples may be received every commercial power grid voltage cycle; alternatively, such samples may be received more or less frequently. Based on the received voltage samples, the inverter phase quantity module 246 determines the phase quantity mode for the inverter 104, for example, every 2-10 grid cycles. In some alternative embodiments, a single capacitor may be coupled across the three-phase H-bridge input and the voltage across the capacitor sampled for determining phase quantity modes.

One or more of the voltage samples may be compared to one or more thresholds for determining the phase quantity mode. For example, when one or more of the voltage samples are less than a first threshold, the inverter 104 operates in a first phase quantity mode and generates a single phase of output power; when one or more of the voltage samples are between the first and a second threshold, the inverter 104 operates in a second phase quantity mode and generates two phases of output power; and when one or more of the voltage samples exceeds the second threshold, the inverter 104 operates in a third phase quantity mode and generates three phases of output power. The first and the second thresholds may be determined based on a maximum admissible voltage ripple across the corresponding PV module 102 as determined by, for example, DC voltage and current of the PV module 102, values of the capacitors 204 and 206, and frequency of the commercial power grid.

Additionally, the inverter phase quantity module 246 may compare one or more of the voltage samples to a burst mode threshold for determining when the inverter 104 operates in a burst mode.

In some alternative embodiments, the inverter 104 may communicate information regarding the phase quantity mode (e.g., the number of phases of AC power to be generated, the inverter output lines on which the phases are to be generated, and the like) to one or more other inverters 104, for example via the inverter PLC transceiver 230.

In other alternative embodiments, the inverter 104 receives information regarding the phase quantity mode (e.g., the number of phases of AC power to be generated, the inverter output lines on which the phases will be generated, and the like) from another inverter 104 or the controller 108, and the conversion controller 244 operates the three-phase H-bridge 220 accordingly.

Figure 3:
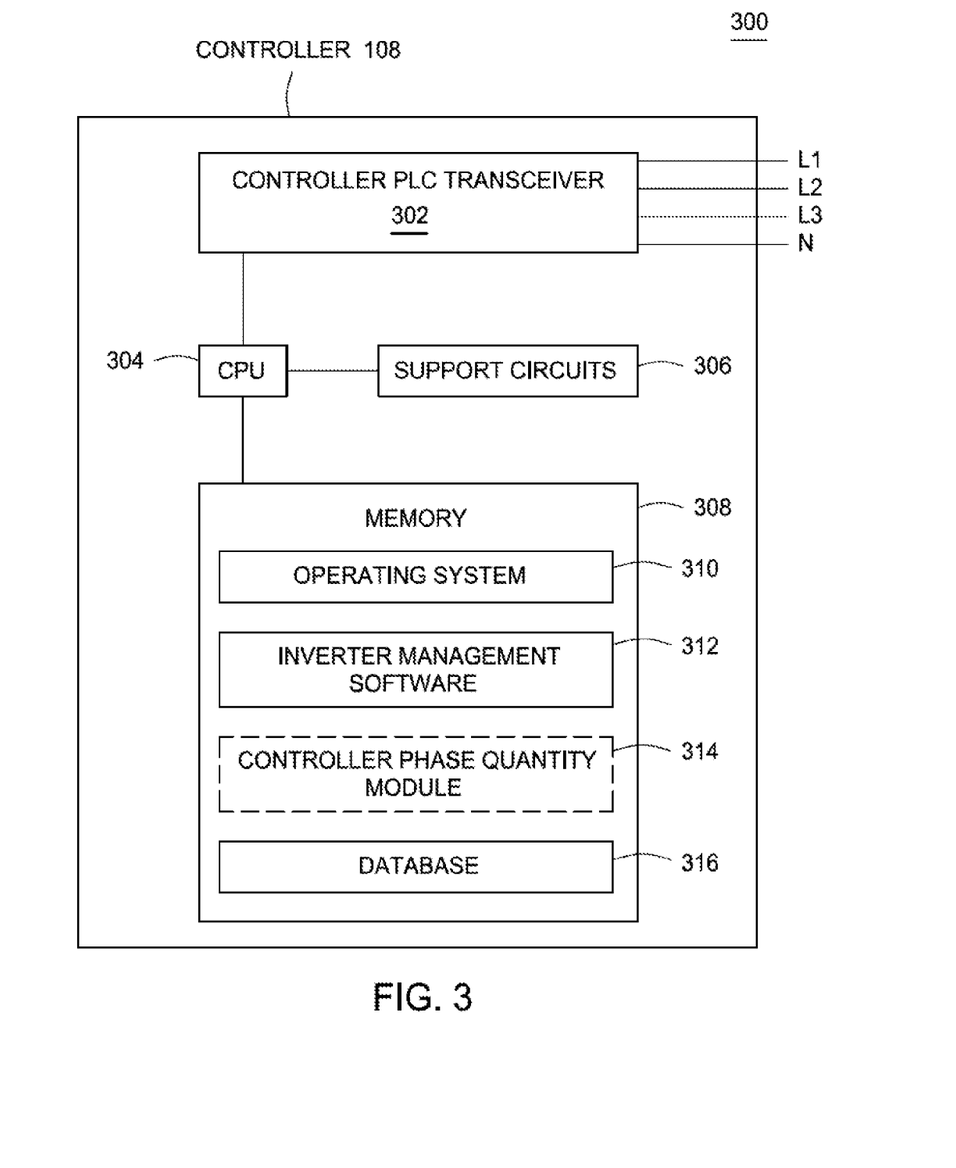
FIG. 3 is a block diagram of a controller in accordance with one or more embodiments of the present invention.

FIG. 3 is a block diagram of a controller 108 in accordance with one or more embodiments of the present invention. The controller 108 comprises a controller power line communication (PLC) transceiver 302, support circuits 306, and memory 308, each coupled to at least one central processing unit (CPU) 304.

The controller PLC transceiver 302 is coupled to power lines L1, L2, L3, and N, for example at the load center 110, for communicatively coupling the controller 108 to the inverters 104. In some alternative embodiments, the controller 108 may utilize other wired and/or wireless communication techniques for communicating with the inverters 104.

The CPU 304 may comprise one or more conventionally available microprocessors. Alternatively, the CPU 304 may include one or more application specific integrated circuits (ASIC). The support circuits 306 are well known circuits used to promote functionality of the CPU 304. Such circuits include, but are not limited to, a cache, power supplies, clock circuits, buses, network cards, input/output (I/O) circuits, and the like. The controller 108 may be implemented using a general purpose processor that, when executing particular software, becomes a specific purpose processor for performing various embodiments of the present invention.

The memory 308 may comprise random access memory, read only memory, removable disk memory, flash memory, and various combinations of these types of memory. The memory 308 is sometimes referred to as main memory and may, in part, be used as cache memory or buffer memory. The memory 308 generally stores an operating system (OS) 310 of the controller 108. The OS 310 may be one of a number of available operating systems for microcontrollers and/or microprocessors.

The memory 308 may store various forms of application software, such as inverter management software 312 for operatively controlling the inverters 104 (e.g., activating/deactivating the inverters 104). In some alternative embodiments, the memory 308 may store a controller phase quantity module 314 for determining and/or controlling the phase quantity mode of the inverters 104. In such embodiments, one or more inverters 104 may communicate data pertaining to an input power (e.g., input power to a multi-phase DC/AC inversion stage) to the controller 108; such data may be communicated, for example, every commercial power grid voltage cycle. Based on such data, the controller phase quantity module 314 may determine, for example every 2-10 grid cycles, a phase quantity mode for the inverters 104. For example, the controller phase quantity module 314 may compare at least a portion of the received data to one or more thresholds for determining the phase quantity mode as described above. The controller 108 may then direct the inverters 104 to operate in the determined phase quantity mode (i.e., to generate one, two, or three phases of power); additionally or alternatively, the controller 108 may direct the inverters 104 to generate the required output power on certain inverter output lines P1, P2, and/or P3. In some such embodiments, the controller phase quantity module 314 may determine when the inverter 104 operates in a burst mode; e.g., the controller phase quantity module 314 may compare at least a portion of the received data to a burst mode threshold for determining when the inverter 104 operates in a burst mode.

The memory 308 may further store a database 316 for storing information related to the present invention, such as data received from the inverters 104 (e.g., input power data);

power thresholds for determining the phase quantity mode, burst mode thresholds, and the like.

Figure 4:
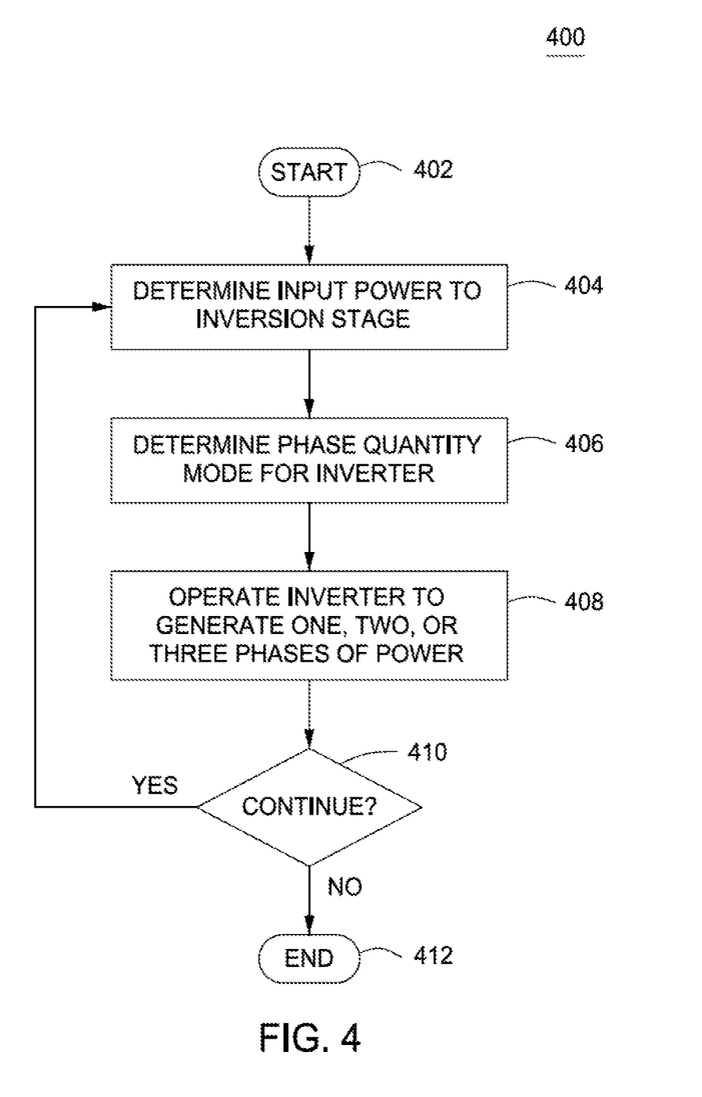
FIG. 4 is a flow diagram of a method for operating a multi-phase DC/AC inverter in accordance with one or more embodiments of the present invention.

FIG. 4 is a flow diagram of a method 400 for operating a multi-phase DC/AC inverter in accordance with one or more embodiments of the present invention. In some embodiments, such as the embodiment described below, a DC/AC inverter comprises a three-phase DC/AC inversion stage (e.g., inverter 104 comprising three-phase H-bridge 220) for inverting a DC input to an AC output, where the three-phase DC/AC inversion stage may be operated to generate one, two, or three phases of AC power. The DC input may be received from a PV module coupled to the DC/AC inverter; alternatively, the input power may be received from any suitable DC power source. The generated AC output power may then be coupled, for example, to a commercial power grid.

In some embodiments, the DC/AC inverter is a voltage source inverter (VSI); alternatively, the inverter may be a current source inverter (CSI), matrix inverter, cyclo-converter, or the like.

In other embodiments, the DC/AC inverter may comprise a two-phase DC/AC inversion stage that may be operated to generate one or two phases of AC power.

The method 400 starts at step 402 and proceeds to step 404. At step 404, an available power to the DC/AC inverter, such as input power to the DC/AC inversion stage, is determined. In some embodiments, the DC/AC inversion stage input power may be determined every commercial power grid cycle; alternatively, the DC/AC inversion stage input power may be determined more or less frequently. In some embodiments, a series combination of two capacitors may be coupled across the DC/AC inversion stage input and a neutral line output of the inverter is coupled between the capacitors. In such embodiments, DC voltages across each of the capacitors may be sampled for determining input power. In some alternative embodiments, a single capacitor may be coupled across the DC/AC inversion stage input and the voltage across the capacitor sampled for determining input power.

The method 400 proceeds to step 406. At step 406, the inverter determines a phase quantity mode for operation based on the input power. In some embodiments, the phase quantity mode may be determined every 2-10 commercial power grid cycles; alternatively, the phase quantity mode may be determined more or less frequently. The phase quantity mode indicates a number of phases of AC power to be generated by the DC/AC inversion stage (e.g., one, two, or three phases). In some embodiments, the phase quantity mode may be determined by comparing the inversion stage input power to one or more thresholds. For example, a first phase quantity mode may be used to generate a single phase of AC power when the input power is less than a first threshold, a second phase quantity mode may be used to generate two phases of AC power when the input power is between the first and a second threshold, and a third phase quantity mode may be used to generate three phases of AC power when the input power exceeds the second threshold. The first and second thresholds may be determined based on a maximum admissible voltage ripple across the PV module as determined by, for example, DC voltage and current of the PV module, values of one or more capacitors within the inverters, and frequency of the AC line to which the inverter is coupled (e.g., the commercial power grid frequency). The decision point is built around maximum power conversion efficiency and maximum energy harvest; by reducing the number of phases generated when lower input power is received, less energy is expended in driving switches within the inverter. In order to determine an optimum solution, losses may be computed either in real time or once and for all, and efficiency curves may be compared in all cases to select the best solution. In some embodiments, power may be the main input to this decision; additionally or alternatively, DC and grid voltages may be used as part of the decision.

In some alternative embodiments, the inverter may communicate the determined mode to one or more other inverters; additionally or alternatively, the inverter may communicate information to one or more other inverters indicating on which inverter output lines the power should be generated. In other alternative embodiments, a centralized controller (e.g., the controller 108) may determine the phase quantity mode and communicate the determined mode to the inverter. In such embodiments, the centralized controller may receive information from the inverter, for example the samples of the input power to the DC/AC inversion stage, for determining the phase quantity mode. The controller may also communicate information to the inverter to indicate on which inverter output lines the power should be generated.

The method 400 proceeds to step 408. At step 408, the DC/AC inversion stage is operated to generate one, two, or three phases of AC power based on the phase quantity mode. As described above, the generated phase or phases of power may be output on fixed inverter output lines. Alternatively, the generated phases may be output on inverter output lines as determined by the inverter, for example, based on a random allocation of power output to phase number (e.g., based on a random word generation, such as 1 to 3, at inverter power up), a decision based on inverter serial number (e.g., inverters having serial numbers within certain ranges utilize certain output lines), remote provisioning, or similar techniques. In some alternative embodiments, the output lines for couple one or two phases of output power may be specified by another inverter or the controller.

In some embodiments, when an inverter is operating to generate a single phase of output power, the inverter may operate in a burst mode if the available power becomes low enough to satisfy a burst mode threshold (e.g., when it is determined that the inversion stage input power satisfies a burst mode threshold). When operating in such a burst mode, the inverter stores energy over one or more AC line cycles and subsequently "bursts" the stored energy to the output line. In some such embodiments, the inverter may determine when the input power satisfies the burst mode threshold for operating in burst mode. In some alternative embodiments, the controller may make such a determination and communicate information to the inverter for operating in the burst mode.

The method 400 proceeds to step 410, where a determination is made whether to continue operating the inverter. If the result of such determination is yes, the method 400 returns to step 404. In some embodiments, the input power is compared to one or more thresholds every 2-10 commercial power grid cycles for determining the phase quantity mode for the inverter. If, at step 410, a determination is made to not continue operating the inverter, the method 400 proceeds to step 412 where it ends.

Figure 5:
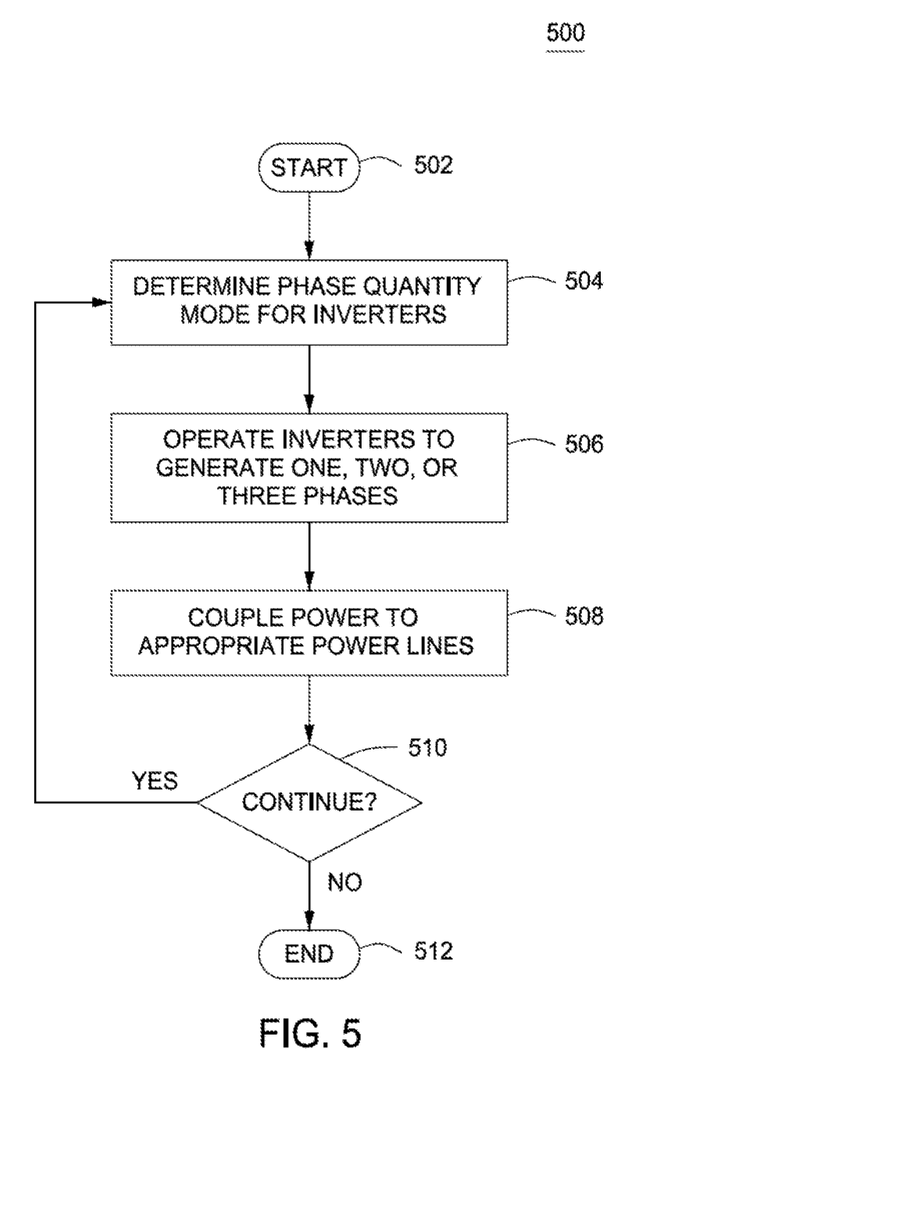
FIG. 5 is a flow diagram of a method for operating a plurality of DC/AC inverters to generate multi-phase AC power in accordance with one or more embodiments of the present invention.

FIG. 5 is a flow diagram of a method 500 for operating a plurality of DC/AC inverters to generate multi-phase AC power in accordance with one or more embodiments of the present invention. In some embodiments, such as the embodiment described below, a plurality of DC/AC inverters are coupled in a branch circuit configuration for providing a three-phase AC power to a load center (e.g., as in the power generation system 100). The DC/AC inverters each comprise a multi-phase DC/AC inversion stage for inverting a DC input to an AC output (e.g., inverters 104 comprising three-phase H-bridge 220). The multi-phase DC/AC inversion stages may each be operated to produce one, two, or three phases of AC power based on a phase quantity mode for the corresponding inverter. In some alternative embodiments, the branch circuit may provide a two-phase AC power to a load center and the multi-phase DC/AC inversion stages are each operated to produce one or two phases of AC power based on the phase quantity mode.

In some embodiments, the DC/AC inverters are voltage source inverters (VSI); alternatively, the inverters may be current source inverters (CSI), matrix inverters, cyclo-converters, or the like.

The method 500 starts at step 502 and proceeds to step 504. At step 504, one or more phase quantity modes for operating the inverters are determined, for example, as described above with respect to the method 400. The phase quantity modes may be determined every 2-10 commercial power grid cycles; alternatively, the phase quantity mode may be determined more or less frequently. Each of the inverters independently determines a phase quantity mode for operation based on the input power to its DC/AC inversion stage, as previously described. In some alternative embodiments, a single phase quantity mode for operating all of the inverters may be determined. In some such embodiments, one of the inverters may determine the phase quantity mode and may communicate the determined mode to one or more of the other inverters. In other such embodiments, a centralized controller (e.g., the controller 108) may determine the phase quantity mode and communicate the determined mode to the inverters, where the centralized controller may receive information from the inverters, for example samples of the voltages across the DC/AC inversion stages, for determining the phase quantity mode.

The method 500 proceeds to step 506. At step 506, the DC/AC inversion stages are operated to generate one, two, or three phases of AC power based on the determined phase quantity mode for each inverter. For each inverter, each phase of output power may be updated accordingly at its zero crossing (for example, power generation on a particular phase may cease or begin at a zero-crossing for that phase); alternatively, all phases of output power may be updated simultaneously. In some embodiments, when an inverter is operating to generate a single phase of output power, the inverter may operate in a burst mode when the available power becomes low enough to satisfy a burst mode threshold as previously described. The method 500 proceeds to step 508.

At step 508, the generated power is coupled to the appropriate lines of the branch circuit for providing a substantially balanced three-phase AC power from the branch circuit. In some embodiments, the inverters each generate power on the same respective inverter output lines and a phase rotation technique is utilized to rotate the phases of the power lines between inverters. The phase rotation technique couples the inverter output lines for subsequent inverters to different live conductor power lines than the preceding inverter; e.g. inverter output lines P1-1, P1-2, and P1-3 are coupled to power lines L1, L3, and L2, respectively. Thus, when the inverters each generate power on the same respective inverter output lines, the branch circuit provides three-phase AC power regardless of the number of phases of power being generated by each inverter. Such a phase rotation among inverters may be achieved by utilizing phase rotation circuits, such as the phase rotation circuits 106. Alternatively, the phase rotation may be achieved by directly coupling the inverter output lines to the power lines in the appropriate configurations; i.e., each inverter's output lines are coupled to the power lines in a "rotated" configuration from the previous inverter.

In other embodiments, the inverter output lines from each inverter are respectively coupled to the same live conductor power lines and, when generating one or two phases of power, the inverters each generate the output power on a different subset of output lines in order to achieve a substantially balanced three-phase output from the branch circuit. For example, the inverter output lines P1, P2, and P3 may be coupled to power lines L1, L2, and L3, respectively, and each inverter 104 generates a single phase of power on a different output line P1, P2, or P3 to achieve a three-phase power from the branch circuit. In some such embodiments, the inverter output lines to be utilized when generating one or two phases of power are fixed; for example, an inverter always utilizes inverter output line P1 when generating a single phase of output power. Alternatively, each inverter may determine the output lines on which to generate the output power based on a random allocation of power output to phase number (e.g., based on a random word generation, such as 1 to 3, at inverter power up), a decision based on inverter serial number (e.g., inverters having serial numbers within certain ranges utilize certain output lines), remote provisioning, or similar techniques.

In some alternative embodiments, the centralized controller may instruct each of the inverters as to which inverter output lines should be utilized for the generated output power, or one or more inverters may determine on which inverter output lines the power is to be generated and may communicate such information to one or more other inverters.

In some embodiments, each of the inverters is coupled to a neutral line of the branch circuit and each individual phase of power generated by an inverter is coupled to a single power line. In other embodiments, the inverters are not coupled to the neutral line and the inverters inject power on at least two of the power lines.

The method 500 proceeds to step 510, where a determination is made whether to continue operating the inverters. If the result of such determination is yes, the method 500 returns to step 504. In some embodiments, a phase quantity mode for the inverters is determined every 2-10 commercial power grid cycles at step 504; alternatively, the phase quantity mode may be determined more or less frequently. If, at step 510, a determination is made to not continue operating the inverter, the method 500 proceeds to step 512 where it ends.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. Apparatus for generating AC power, comprising:
a DC/AC inversion stage capable of generating at least two of a single-phase output power, a two-phase output power, and a three-phase output power; and
a conversion control module, coupled to the DC/AC inversion stage, for driving the DC/AC inversion stage to (i) generate the single-phase output power while an input power is less than a first threshold, and (ii) operate in burst mode while the input power satisfies a burst mode threshold.

2. The apparatus of claim 1, wherein the burst mode threshold is less than the first threshold.

3. The apparatus of claim 1, wherein during the burst mode, energy is stored during a cycle of an AC power grid and, subsequent to the cycle, the DC/AC inversion stage couples the stored energy to the AC power grid as the single-phase output power.

4. The apparatus of claim 1, wherein during the burst mode, energy is stored during a plurality of cycles of an AC power grid and, subsequent to the plurality of cycles, the DC/AC inversion stage couples the stored energy to the AC power grid as the single-phase output power.

5. The apparatus of claim 1, wherein the input power is DC power.

6. The apparatus of claim 5, wherein the input power is from a photovoltaic (PV) module.

7. A method for generating AC power, comprising:
  determining an input power to a DC/AC inversion stage, wherein the DC/AC inversion stage is capable of generating at least two of a single-phase output power, a two-phase output power, and a three-phase output power; and
  driving the DC/AC inversion stage to (i) generate the single-phase output power while an input power is less than a first threshold, and (ii) operate in burst mode while the input power satisfies a burst mode threshold.

8. The method of claim 7, wherein the burst mode threshold is less than the first threshold.

9. The method of claim 7, wherein during the burst mode, energy is stored during a cycle of an AC power grid and, subsequent to the cycle, the DC/AC inversion stage couples the stored energy to the AC power grid as the single-phase output power.

10. The method of claim 7, wherein during the burst mode, energy is stored during a plurality of cycles of an AC power grid and, subsequent to the plurality of cycles, the DC/AC inversion stage couples the stored energy to the AC power grid as the single-phase output power.

11. The method of claim 7, wherein the input power is DC power.

12. The method of claim 11, wherein the input power is from a photovoltaic (PV) module.

13. A system for generating AC power, comprising:
  a DC power source; and
  an inverter, coupled to the DC power source, wherein the inverter comprises (a) a DC/AC inversion stage capable of generating at least two of a single-phase output power, a two-phase output power, and a three-phase output power; and (b) a conversion control module, coupled to the DC/AC inversion stage, for driving the DC/AC inversion stage to (i) generate the single-phase output power while an input power is less than a first threshold, and (ii) operate in burst mode while the input power satisfies a burst mode threshold.

14. The system of claim 13, wherein the burst mode threshold is less than the first threshold.

15. The system of claim 13, wherein during the burst mode, energy is stored during a cycle of an AC power grid and, subsequent to the cycle, the DC/AC inversion stage couples the stored energy to the AC power grid as the single-phase output power.

16. The system of claim 13, wherein during the burst mode, energy is stored during a plurality of cycles of an AC power grid and, subsequent to the plurality of cycles, the DC/AC inversion stage couples the stored energy to the AC power grid as the single-phase output power.

17. The system of claim 13, wherein the input power is DC power.

18. The system of claim 13, wherein the DC power source is a photovoltaic (PV) module.

* * * * *